(12) United States Patent
Franczuz

(10) Patent No.: US 12,490,695 B2
(45) Date of Patent: Dec. 9, 2025

(54) HYDROPONIC GROWTH SYSTEM AND PLANT TRAY ASSEMBLY THEREOF

(71) Applicant: Rapidgrow Industries Inc., Maple Ridge (CA)

(72) Inventor: Brian Franczuz, Maple Ridge (CA)

(73) Assignee: Rapidgrow Industries Inc., Maple Ridge (CA)

( * ) Notice: Subject to any disclaimer, the term of this patent is extended or adjusted under 35 U.S.C. 154(b) by 956 days.

(21) Appl. No.: 17/477,256

(22) Filed: Sep. 16, 2021

(65) Prior Publication Data

US 2022/0000049 A1 Jan. 6, 2022

Related U.S. Application Data

(63) Continuation-in-part of application No. 15/899,757, filed on Feb. 20, 2018, now Pat. No. 11,147,220.

(51) Int. Cl.
*A01G 31/02* (2006.01)

(52) U.S. Cl.
CPC ................. *A01G 31/0233* (2025.01)

(58) Field of Classification Search
CPC ................. A01G 31/02; A01G 31/0233
See application file for complete search history.

(56) References Cited

U.S. PATENT DOCUMENTS

| | | | |
|---|---|---|---|
| 2,188,875 A | 1/1940 | Ellis | |
| 2,241,699 A | 5/1941 | Cooper | |
| 2,592,976 A | 4/1952 | Thomas | |
| 2,983,076 A | 5/1961 | Merrill | |
| 3,271,900 A | 9/1966 | Mori | |
| 3,451,162 A | 6/1969 | Rasmussen | |
| 4,033,072 A | 7/1977 | Kobayashi et al. | |
| 4,056,899 A | 11/1977 | Close | |
| 4,302,906 A * | 12/1981 | Kawabe | A01G 31/02 47/62 C |
| 4,371,995 A * | 2/1983 | Donhauser | A47K 3/02 4/584 |

(Continued)

FOREIGN PATENT DOCUMENTS

| | | | |
|---|---|---|---|
| CN | 104705227 A | * | 6/2015 |
| EP | 0801891 A1 | * | 10/1997 |

(Continued)

OTHER PUBLICATIONS

Translation of FR 2400323, Douhet, (Year: 1977).*

*Primary Examiner* — Magdalena Topolski
(74) *Attorney, Agent, or Firm* — Nicholas Garner; Oyen Wiggs Green & Mutala LLP

(57) ABSTRACT

A hydroponic growth system comprises a reservoir including a lower chamber, an upper chamber, and a divider therebetween. The divider has a first aperture and a second aperture. The system includes an air blower in fluid communication with the lower chamber. Actuation of the air blower causes fluid from the lower chamber to pass through the first aperture and selectively flood the upper chamber. The valve inhibits communication between the lower chamber and the upper chamber via the second aperture in a resting state. Upon actuation of the air blower, the valve moves to a flooding state in which communication between the lower chamber and the upper chamber via the second aperture is promoted.

20 Claims, 10 Drawing Sheets

(56) References Cited

U.S. PATENT DOCUMENTS

| | | | |
|---|---|---|---|
| 4,419,842 A | 12/1983 | Paloian | |
| 4,669,217 A | 6/1987 | Fraze | |
| 4,754,571 A | 7/1988 | Riechmann | |
| 4,882,875 A | 11/1989 | Green | |
| 5,337,515 A | 8/1994 | Robins | |
| 5,385,590 A * | 1/1995 | Sledge | A01G 27/001 47/79 |
| 5,860,247 A | 1/1999 | Newby | |
| 5,887,383 A | 3/1999 | Soeda | |
| 5,992,092 A | 11/1999 | Furuta | |
| 6,584,730 B1 | 7/2003 | Mai | |
| 6,622,430 B1 | 9/2003 | Lai | |
| 7,516,574 B2 | 4/2009 | Gottlieb et al. | |
| 8,146,292 B2 | 4/2012 | Brandstätter | |
| D741,742 S | 10/2015 | Kunnas et al. | |
| 11,147,220 B2 | 10/2021 | Franczuz | |
| 2005/0000159 A1 | 1/2005 | Billette | |
| 2009/0313894 A1 | 12/2009 | Bieber | |
| 2010/0269409 A1 | 10/2010 | Johnson | |
| 2013/0081327 A1 | 4/2013 | Buck et al. | |
| 2013/0255152 A1 | 10/2013 | Johnson et al. | |
| 2014/0075841 A1 | 3/2014 | Degraff | |
| 2015/0282444 A1 * | 10/2015 | Butler | A01G 31/06 47/62 C |
| 2020/0008374 A1 | 1/2020 | Coleman | |

FOREIGN PATENT DOCUMENTS

| | | | |
|---|---|---|---|
| FR | 2400323 A1 * | 8/1977 | |
| GB | 2420483 A * | 5/2006 | A01G 31/06 |
| GB | 2545163 A * | 6/2017 | A01G 31/00 |
| JP | 2006262762 A | 10/2006 | |
| WO | WO-2007070959 A1 * | 6/2007 | A01G 31/06 |
| WO | 2010008813 A2 | 1/2010 | |
| WO | WO-2014035294 A1 * | 3/2015 | A01G 27/02 |

* cited by examiner

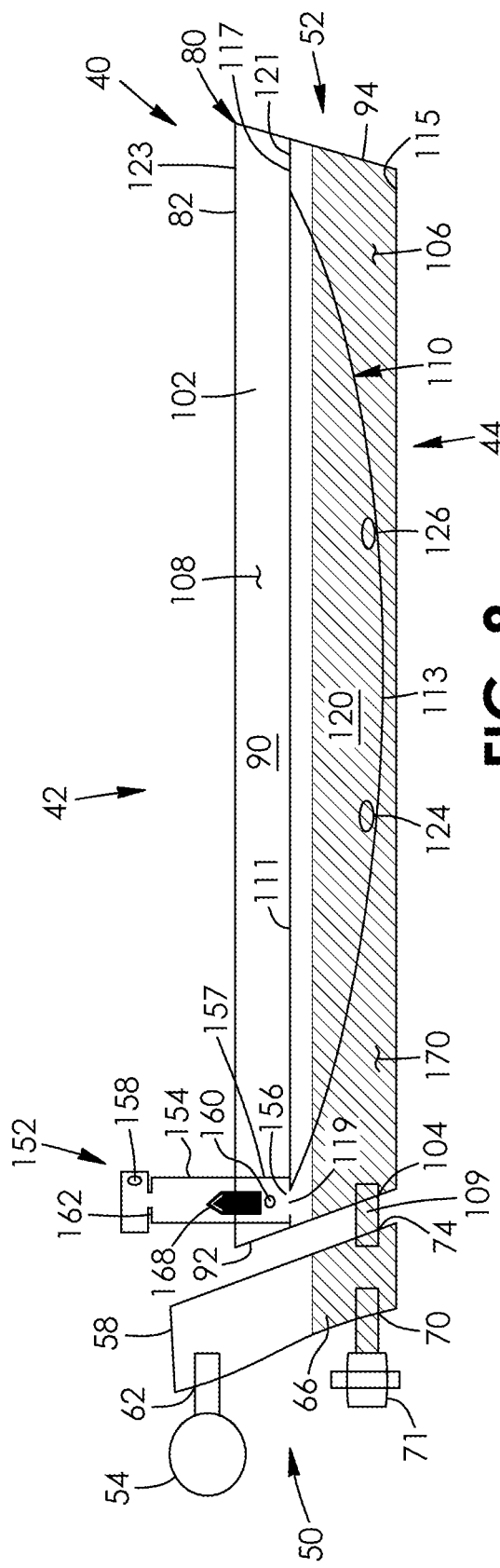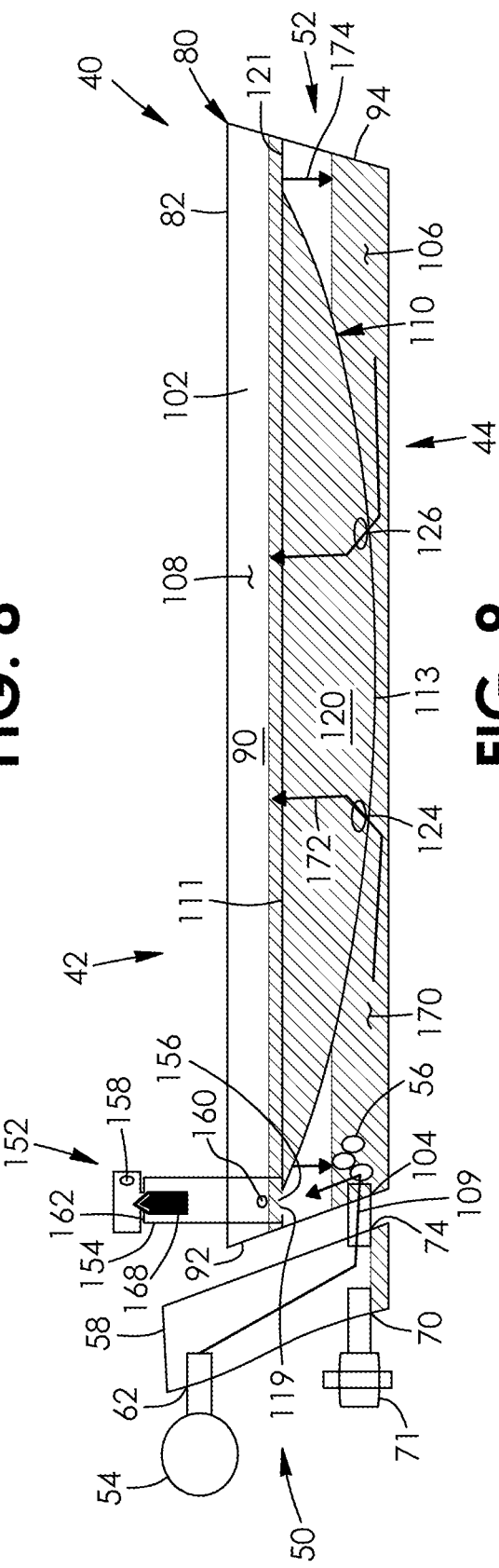

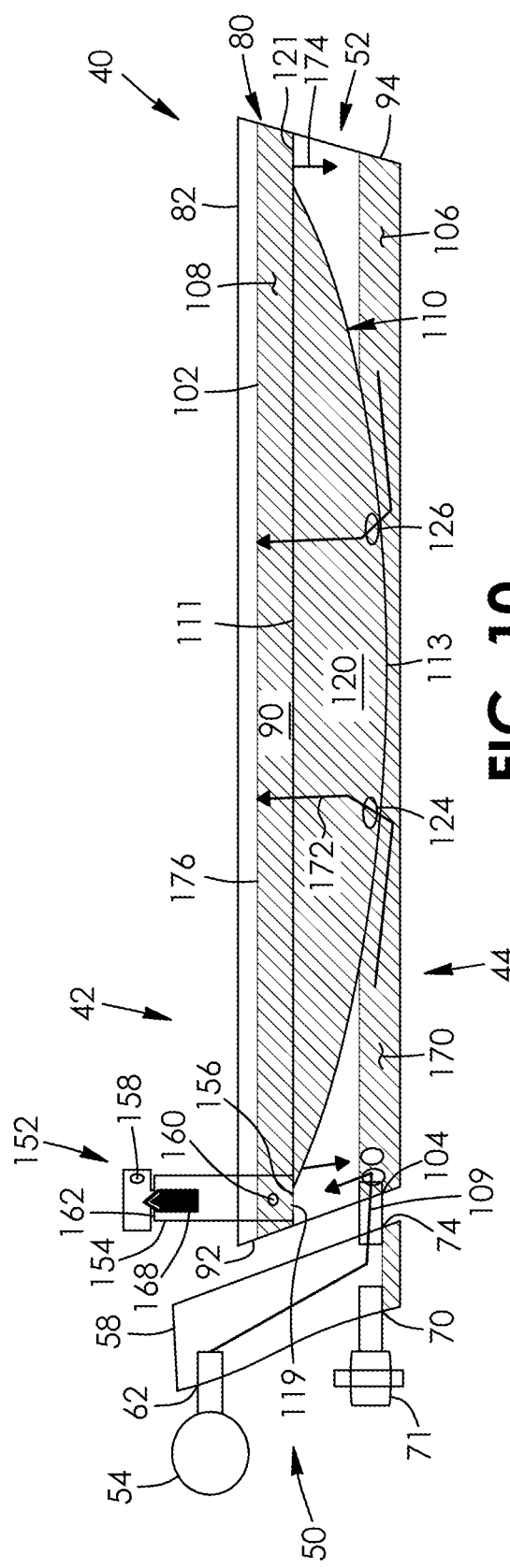
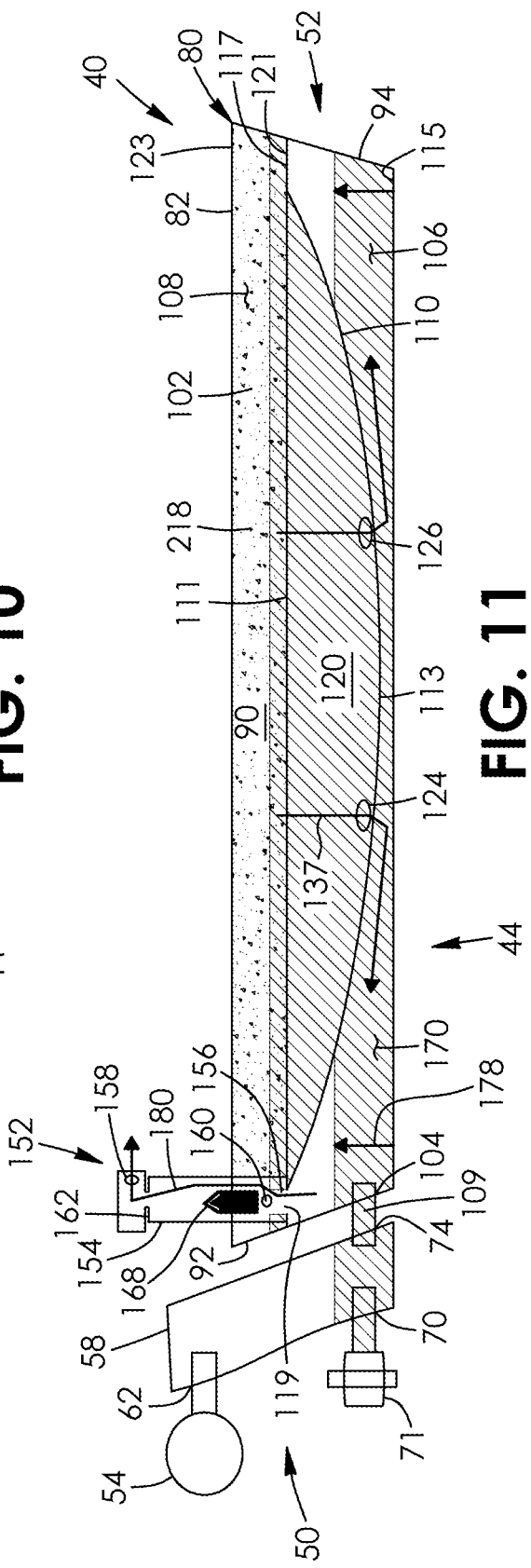

HYDROPONIC GROWTH SYSTEM AND PLANT TRAY ASSEMBLY THEREOF

FIELD OF THE INVENTION

There is provided a growth system. In particular, there is provided a hydroponic growth system, and a plant tray assembly thereof.

DESCRIPTION OF THE RELATED ART

U.S. Pat. No. 4,419,842 to Paloian discloses a hydroponic device. The device includes a hollow housing which defines a substantially closed lower chamber for receiving a liquid nutrient solution and a top open-ended upper chamber for receiving an inert filler material and the desired vegetation which are separated by a partition wall. At least one nutrient supply pipe is coupled to the partition wall and extends downwardly into the lower chamber. The supply pipe has a throughput bore extending therethrough to establish fluid communication between the upper chamber and the lower chamber, whereby the nutrient solution may be fed in a continuous cycle from the lower chamber to the upper chamber and back again.

U.S. Pat. No. 5,860,247 to Newby discloses a multiple function hydroponics system consisting of three major components: a plant pot container, a reservoir container and a pumping chamber. The plant pot container has a drainage tube down into the reservoir. This drainage tube height is adjusted to determine the upper level that the liquid can reach within the plant pot container. For an ebb and flow type operation of the assembly there is a siphon tubes from the bottom of the plant pot container back into the pumping chamber to drain the plant pot container each cycle. For top down watering or a drip system a watering tube assembly is installed so that each plant has a fluid outlet opening. The liquid pumping chamber, which contains a cycling container, is connected to the bottom of the reservoir with tubing and a one way valve allowing liquid to enter. When in the top down watering mode, the height of the drainage tube within the plant pot container is lowered so as to allow complete drainage back into the reservoir. The incoming pressurized air coming into the pumping chamber enters at the lowest level so as to aerate the water. In operation with the cycling container resting near the bottom of the liquid pumping chamber the gas within the system is expanded in the pumping chamber, the resultant pressure build-up in turn forces liquid out of the cycling container tube and the siphoning tube. When the liquid in the chamber reaches a predetermined level, the pressurized gas is released to the atmosphere through the cycling container tube, liquid from the plant pot container refills the pumping chamber through the siphon tube, and the reservoir as the pumping chamber is now open to the atmosphere. When the pumping chambers refill to a predetermined level, the cycling container sinks and the cycle repeats.

United States Patent Application Publication No. 2014/0075841 A1 to DeGraff discloses a hydroponic growing system that incorporates a non-woven soft-sided fabric container housed and/or supported within a plant reservoir container is proposed. The system includes a main reservoir that is in communication with multiple plant reservoir containers connected each other. The predetermined intervals are set and controlled by the controller at the main reservoir to fill and drain the plant reservoir containers. With an aid of use of a soft-sided fabric container made of fine mesh-like non-woven material, the present invention minimizes the medium from travelling with nutrients when the pump is activated to drain the bucket. In addition, the present invention includes aeration devices, such as an air tube, creating a vent which minimizes water resistance when draining the bucket. Variations on the type or material for the soft-sided fabric container, and various methods for supporting and suspending the soft-sided fabric containers can be considered.

U.S. Pat. No. 4,056,899 to Close discloses a planter with self-contained irrigation system. The system includes a potting portion for receiving soil and a plant to be grown and a reservoir portion which acts as a base for the potting portion and which also carries the liquid to be used in irrigating the plant and the means for pumping the liquid to the potting portion. The potting portion has a liquid-return valve for returning to the reservoir portion any liquid not dissipated in the potting portion.

BRIEF SUMMARY OF INVENTION

There is provided, and it is an object to provide, an improved hydroponic growth system and plant tray assembly thereof.

There is accordingly provided a hydroponic growth system. The system comprises a reservoir including a lower chamber, an upper chamber, and a divider therebetween. The divider has a first aperture and a second aperture. The system includes an air blower in fluid communication with the lower chamber. Actuation of the air blower causes fluid from the lower chamber to pass through the first aperture and selectively flood the upper chamber. The valve inhibits communication between the lower chamber and the upper chamber via the second aperture in a resting state. Upon actuation of the air blower, the valve moves to a flooding state in which communication between the lower chamber and the upper chamber via the second aperture is promoted.

There is also provided a hydroponic tray assembly. The assembly includes a lower chamber, an upper chamber, and a divider between the chambers. The divider has a first aperture, has a second aperture, and includes at least one central channel which extends between opposite ends of the assembly. The first aperture extends through the channel. The channel is arcuate-shaped in longitudinal cross-section between the ends of the assembly.

There is further provided a hydroponic tray assembly. The assembly includes a lower chamber, an upper chamber, and a divider between the chambers. The divider has a first aperture, has a second aperture, and includes at least one plurality of concentrically positioned and radially spaced-apart set of arcuate-shaped baffles.

There is additional provided a hydroponic growth system comprising a plant-growing chamber. The system includes a reservoir in fluid communication with, coupled to and positioned below the plant-growing chamber. Pressurized air blown into the reservoir causes nutrient solution therewithin adjacent the bottom of the reservoir to flash flood the plant-growing chamber.

There is yet also provided a hydroponic growth system comprising a plant-growing chamber and a reservoir in fluid communication with, coupled to and positioned below the plant-growing chamber. Pressurized air blown into the reservoir causes nutrient solution therewithin adjacent the bottom of the reservoir to pass directly to the bottom of the plant-growing chamber and towards the top of the plant-growing chamber.

There is yet further provided a method of growing plants. The method includes providing a container with a reservoir in a lower portion thereof, a plant-growing chamber in an upper portion thereof, and a channel which extends from adjacent the bottom of the plant-growing chamber to adjacent the bottom of the reservoir. The method includes flash flooding the plant-growing chamber with nutrient solution from the reservoir by blowing pressurized air into the reservoir.

BRIEF DESCRIPTION OF DRAWINGS

The invention will be more readily understood from the following description of preferred embodiments thereof given, by way of example only, with reference to the accompanying drawings, in which:

FIG. 8 is a side elevation schematic view of the hydroponic growth assembly of FIG. 1, with the assembly shown in a rest mode;

FIG. 9 is a side elevation schematic view of the hydroponic growth assembly of FIG. 1, with the assembly shown in a partially flooded mode;

FIG. 10 is a side elevation schematic view of the hydroponic growth assembly of FIG. 1, with the assembly shown in a fully flooded mode;

FIG. 11 is a side elevation schematic view of the hydroponic growth assembly of FIG. 1, with the assembly shown in a drain mode;

DESCRIPTION OF THE PREFERRED EMBODIMENTS

Figure 1:
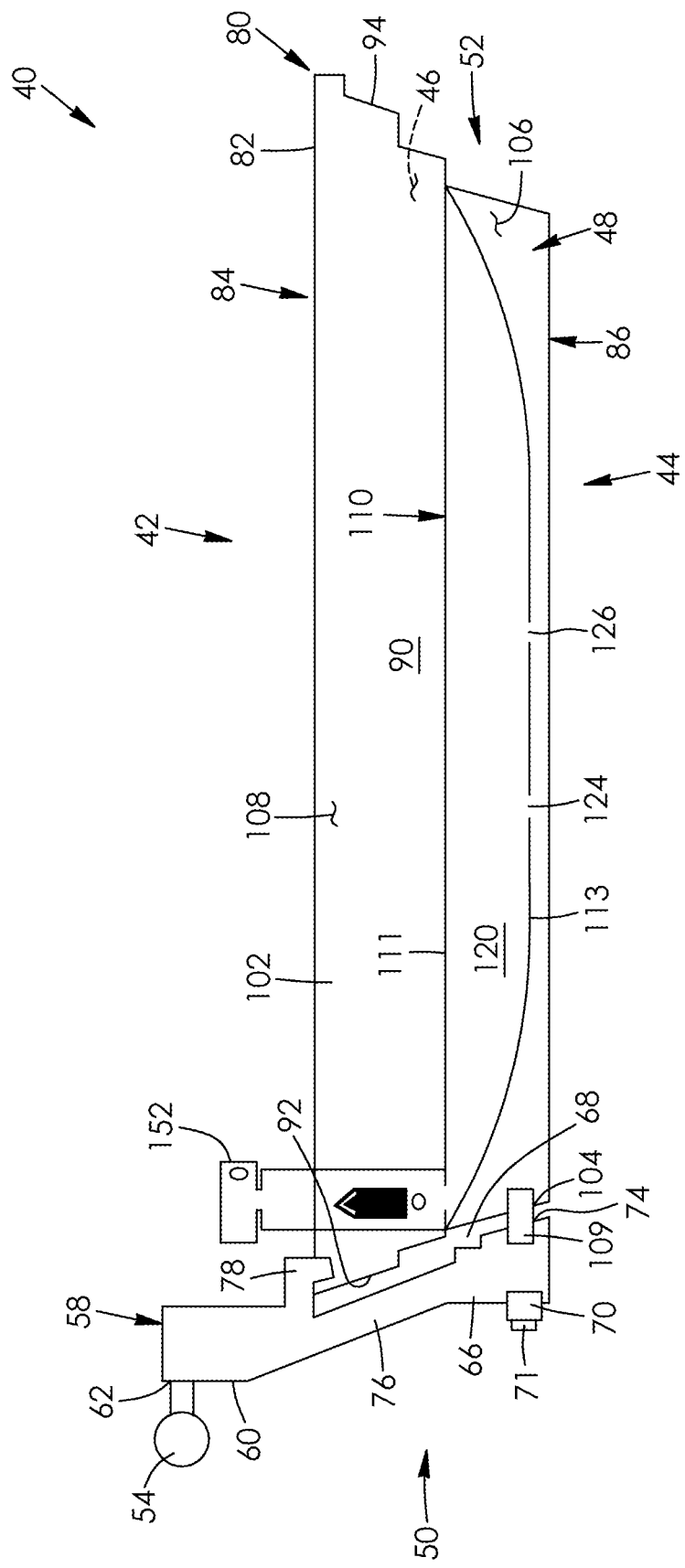
FIG. 1 is a side elevation schematic view of a hydroponic growth assembly accordingly to a first aspect, the system including an air blower, a manifold, a shuttle valve and a plant tray assembly.

Referring to the drawings and first to FIG. 1, there is shown a hydroponic growth system 40. The assembly has a top 42, bottom 44, a pair of spaced-apart sides 46 and 48, and a pair of spaced-apart ends 50 and 52.

Figure 2:
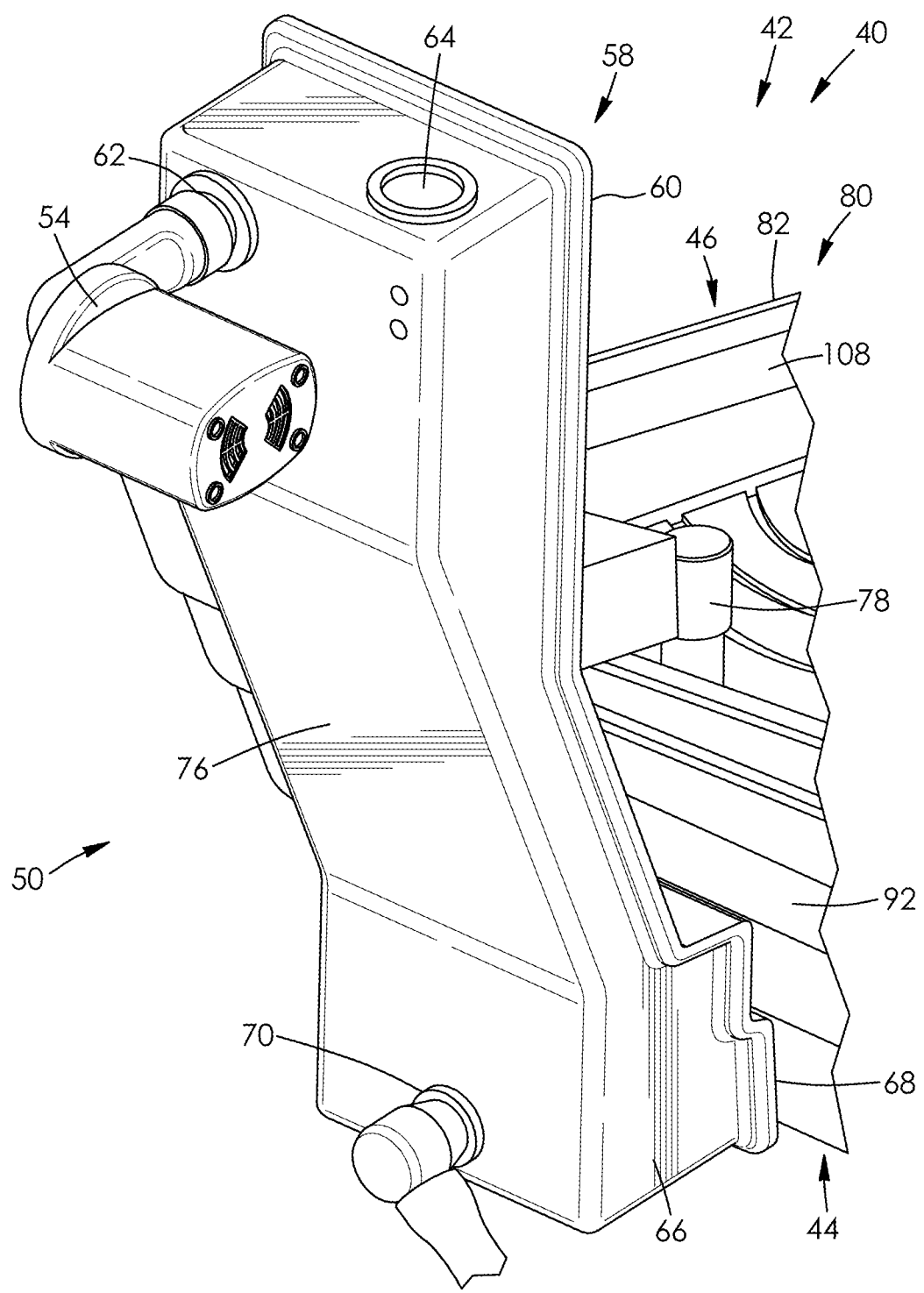
FIG. 2 is a side perspective view of the air blower and the manifold of FIG. 1, with the air blower shown coupled to the manifold and the manifold shown coupled to a part of the plant tray assembly of FIG. 1, the plant tray assembly being shown in fragment.

As seen in FIG. 2, the growth system includes a pressurized air emitting device, in this example an air blower 54 configured to selectively emit or blow air 56 seen in FIG. 9. The air blower is motorized and electric powered in this example. The air blower is positioned along end 50 and adjacent to top 42 of the system 40 in this example. Air blowers per se, including their various parts and functions, are known to those skilled in the art and thus blower 54 will not be described in further detail.

Referring to FIG. 2, the growth system 40 includes a hollow manifold 58 which aligns with end 50 of the system. The manifold has an upper portion 60 that is generally a rectangular prism in its outer form in this example and which extends from the top 42 of the system towards bottom 44 of the system. The manifold has a first inlet, in this example an air inlet 62 aligned with the end 50 of the system 40, which extends through the upper portion of the manifold, and which is in fluid communication with the air blower 54.

The manifold has a second inlet, in this example a fertilizer inlet 64 which aligns with the top 42 of the system and which extends into the tipper portion 60 of the manifold. The fertilizer inlet is shaped to selectively receive fertilizer (not shown) therethrough. The fertilizer inlet 64 is configured to selectively engage with a fertilizer cap (not shown) in this example.

The manifold 58 has a lower portion 66 which aligns with the bottom 44 of the system 40 and which is adjacent to the end 50 of the system. The lower portion of the manifold is generally a rectangular prism in outer form. As seen in FIG. 1, the lower portion 66 of the manifold 58 is positioned towards end 52 of the system 40, relative to upper portion 60 of the manifold. Still referring to FIG. 1, the lower portion 66 of the manifold 58 has a recessed section 68 facing end 52 of the system 40.

The manifold 58 has an outlet 70 to selectively drain fluid therefrom by removing plug 71. The outlet extends into the lower portion 66 of the manifold and aligns with the bottom 44 of the system. The outlet 70 is shaped to selectively receive a drain plug 72 that may be selectively removed to periodically drain the manifold as desired.

As seen in FIG. 1, the manifold 58 includes a port 74 which faces end 52 of the system 40 in this example and which is adjacent to the bottom of the system. The outlet 70 of the manifold is positioned level with or below the port of the manifold, in this example.

Referring to FIG. 2, the manifold 58 has a passageway portion 76 which couples the tipper portion 60 and the lower portion 66 of the manifold together. The passageway portion is generally a rectangular prism in outer form and angles inwards as the passageway portion extends from the upper portion to the lower portion of the manifold in this example. The upper portion, connecting portion and lower portion of the manifold are integrally connected and formed in this example and in fluid communication with each other. As seen in FIG. 1, the manifold 58 includes a hook-shaped portion, in this example a clip 78 between the upper portion and the connecting portion thereof in this example.

Figure 3:
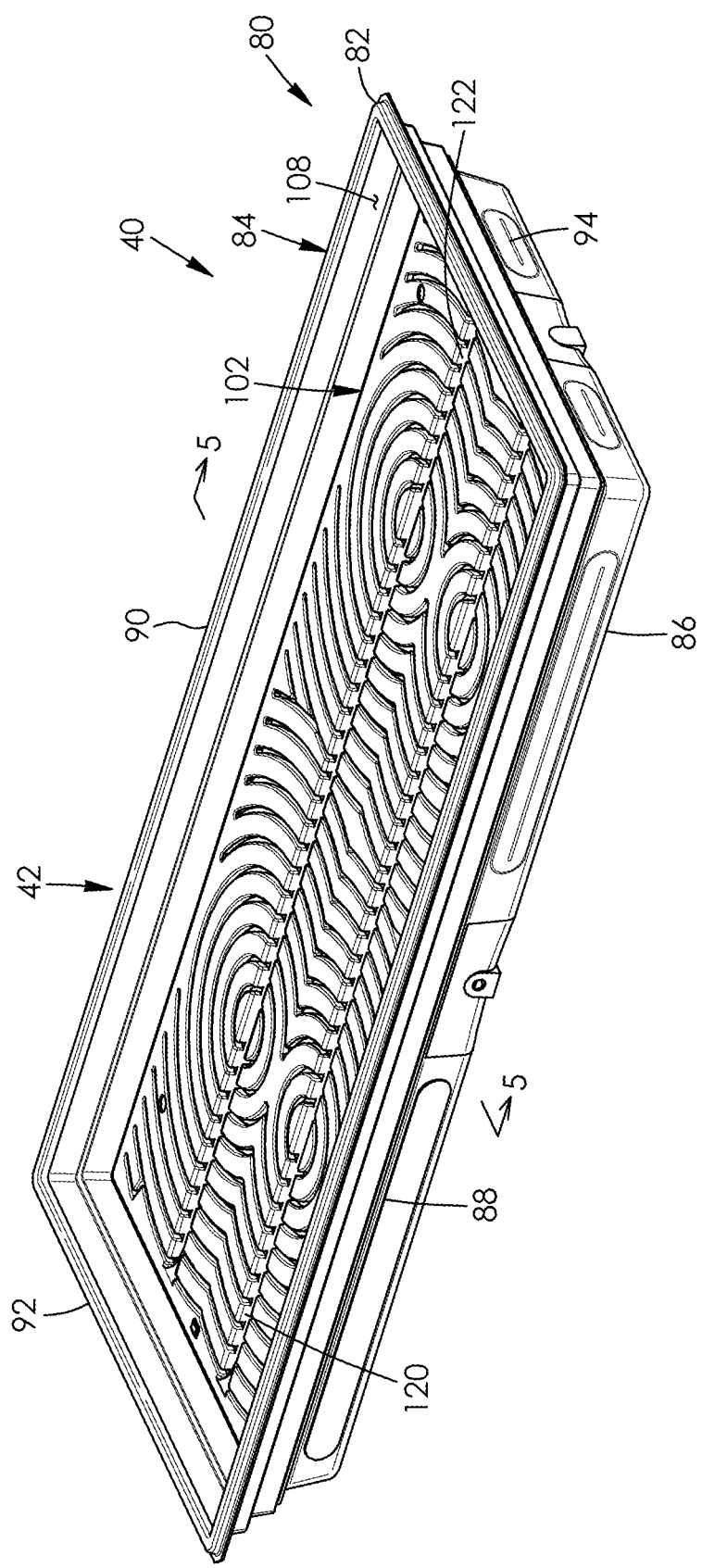
FIG. 3 is a top, side perspective view of the plant tray assembly of FIG. 1.
Figure 4:
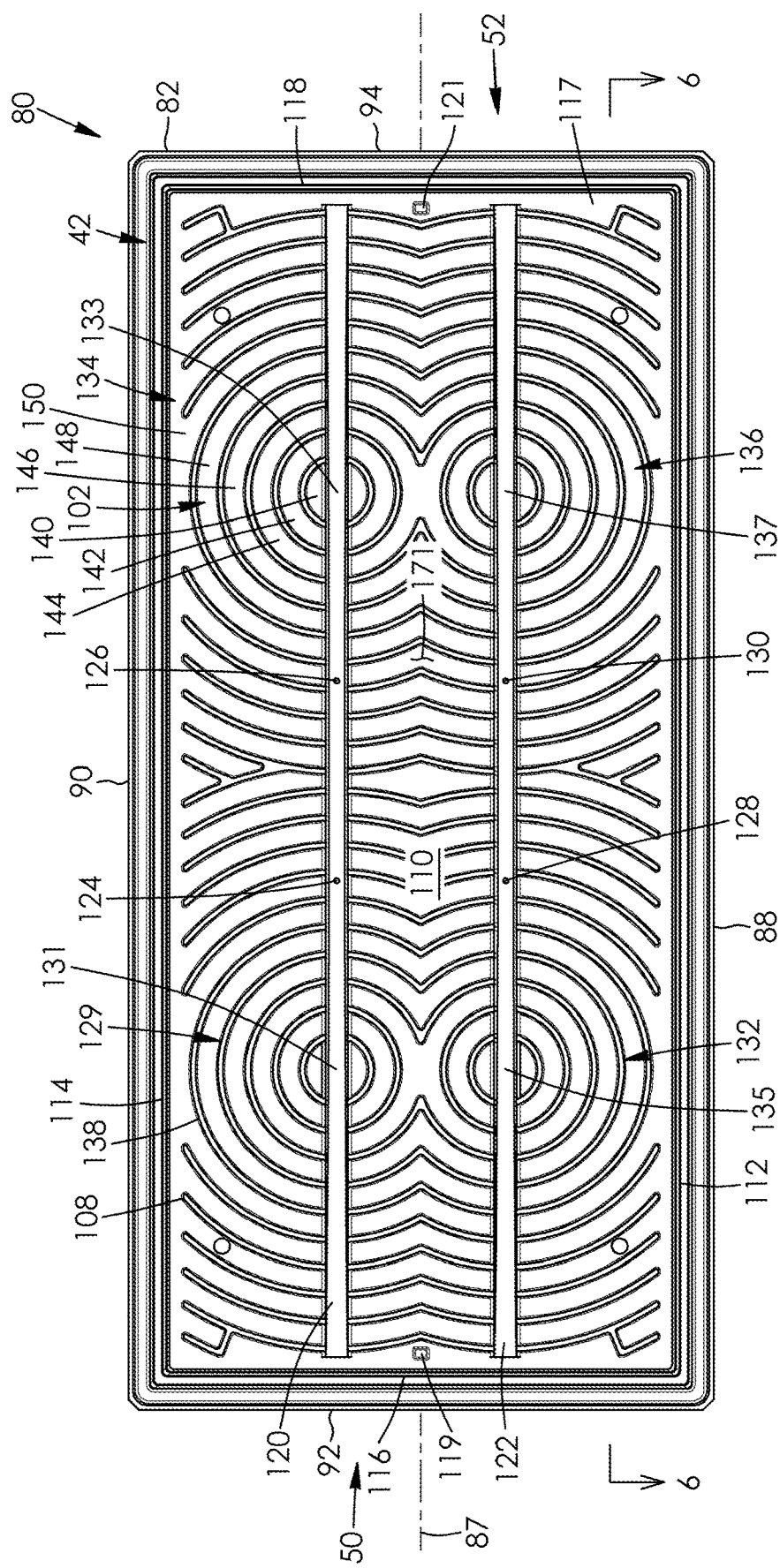
FIG. 4 is a top plan view of the plant tray assembly of FIG. 5.

As best seen in FIG. 3, the growth system 40 includes a reservoir, in this example a hydroponic, plant tray assembly 80. The assembly includes a container 82 having a top 84 and a bottom 86. As seen in FIG. 4, the container has a longitudinal axis 87, a pair of sides 88 and 90 which extend parallel with said axis, and a pair of ends 92 and 94 extending between the sides. The bottom 86, sides and ends are each generally rectangular in shape in this example. The sides and ends of the container 82 couple to and extend upwards from the bottom 86 of the container towards the top of the container.

Figure 5:
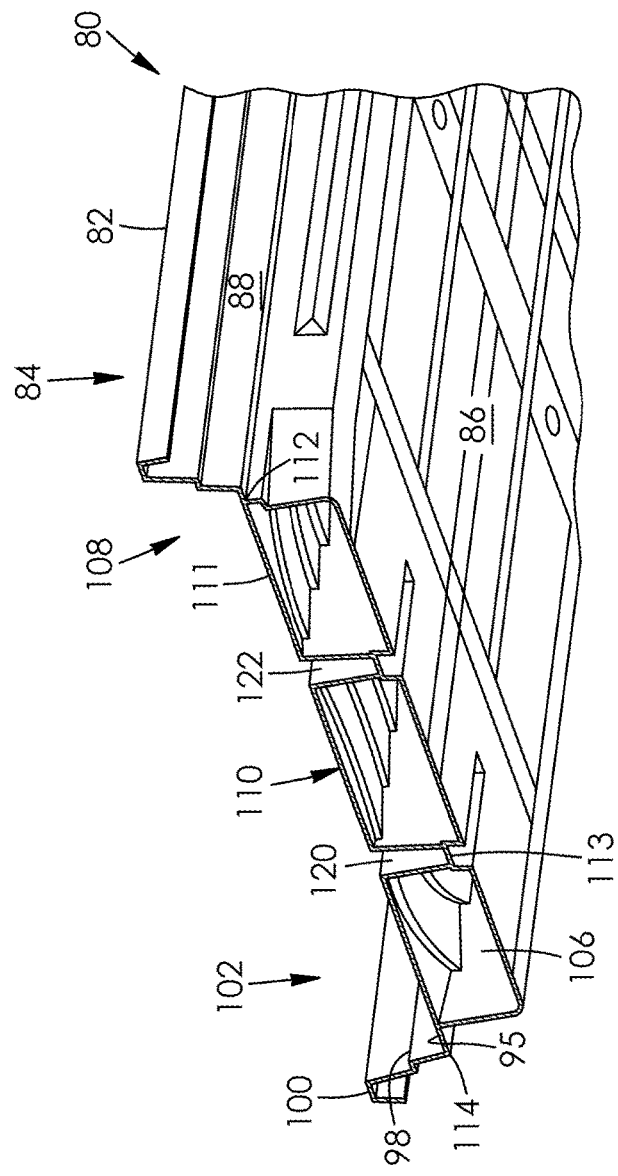
FIG. 5 is a sectional end view of the plant tray assembly of FIG. 3 taken along lines 5-5 of FIG. 3.

As seen in FIG. 5, the sides and ends of the container extend incrementally outwards from the bottom of the container, so as to form a plurality of steps 95 and 98 and an upper rim 100 within the interior 102 of the container in this example. As seen in FIG. 2, the recessed section 68 of the lower portion 66 of the manifold 58 is shaped to receive the corresponding contoured end 92 of the container 82 in this example. As seen in FIG. 1, clip 78 is shaped to extend about and couple to the upper rim 100 of the container to selectively couple the manifold to the container.

Still referring to FIG. 1, the container 82 has a lower aperture 104 adjacent to the bottom 86 thereof and bottom 44 of the system 40. The aperture extends through end 92 of the container.

The plant tray assembly 80 has a lower chamber 106, an upper chamber 108 and a divider 110 extending between the chambers. The lower chamber may be referred to as a reservoir in a lower portion of the container and the upper chamber may be referred to as a plant-growing chamber in an upper portion of the container. The lower chamber 106 is in fluid communication with, coupled to and positioned below the upper chamber 108. As seen in FIG. 1, the lower chamber is enclosed by the sides 90 of the container 82, ends 92 and 94 of the container, the bottom 86 of the container 82, and the divider. The system 40 includes a conduit, in this example tube 109 which extends between port 74 of the manifold 58 and aperture 104 of the container which is located within the lower chamber 106. Port 74 is thus in fluid communication with the lower chamber 106 of the plant tray assembly 80.

The upper chamber 108 is enclosed by the sides 90 of the container, ends 92 and 94 of the container, and extends from the top 84 of the container to the divider 110.

Figure 6:
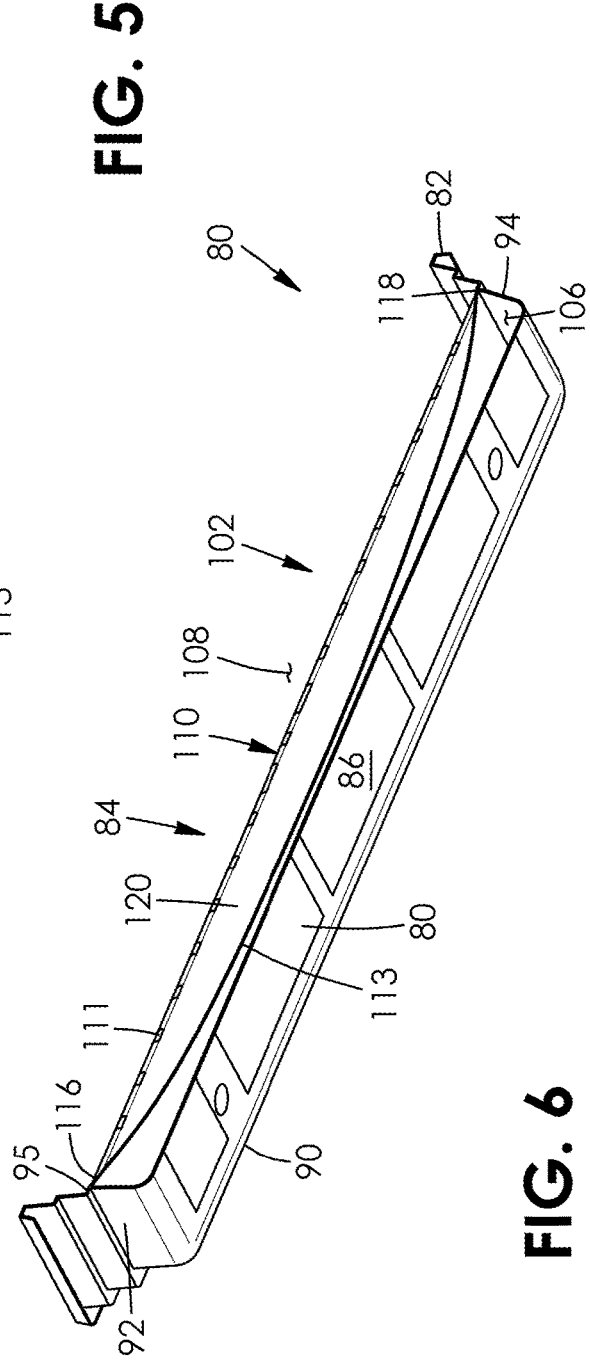
FIG. 6 is a longitudinal sectional view of the plant tray assembly of FIG. 4 taken along lines 6-6 of FIG. 4.

The divider is received within the interior 102 of the container 82. As seen in FIG. 1, the divider 110 has a top 111 positioned between the top 84 and bottom 86 of the container. As seen in FIG. 4, the top of the divider is generally rectangular in shape. Referring back to FIG. 1, the divider 110 has a bottom 113 positioned adjacent to the bottom 86 of the container 82. As seen in FIG. 4, the top 111 of the divider has a pair of spaced-apart sides 112 and 114 which align with and abut the sides 88 and 90 of the container. The top of the divider 110 has a pair of spaced-apart ends 116 and 118 which align with and abut the ends 92 and 94 of the container. As seen in FIGS. 5 and 6, the sides 112 and 114 and ends 94 and 96 of the top of the divider abut and rest upon and on top of step 95 of the container 82 in this example.

As seen in FIG. 4, the divider 110 has a pair of upper apertures, in this example a shuttle valve aperture 119 and a third or overflow aperture 121 which extend through the divider. The apertures are adjacent to respective ends 116 and 118 of the top of the divider in this example and are positioned between the sides 112 and 114 of the top of the divider in this example. As seen in FIG. 9, the air blower 54 is in fluid communication with the lower chamber 106 and is configured to blow air 56 therein. The air blower configured to blow air below the shuttle valve aperture 119 and in this example adjacent to the shuttle valve aperture.

Referring to FIG. 4, the divider 110 includes a pair of spaced-apart, centrally-positioned, longitudinally channels 120 and 122 which extend between ends 50 and 52 of the assembly in this example. The channels are horizontally-extending in this example. The channels 120 and 122 are positioned between the sides 112 and 114 of the divider and parallel to the sides of the divider in this example. As seen in FIG. 5, the channels extend from the top 111 of the divider 110 to the bottom 113 of the divider. The top and bottom of the divider may be referred to tops and bottoms of the channels. As seen in FIG. 8, the channels 120 and 122 extend from the upper chamber 108 towards and adjacent to the bottom 115 of the lower chamber 106. As seen in FIG. 5, each channel has a u-shape when viewed in lateral cross-section in this example. As seen in FIG. 6, each channel is arcuate-shaped in longitudinal cross-section between the ends 94 and 96 thereof in this example.

As seen in FIG. 4, channel 120 has a pair of centrally-positioned flooding apertures 124 and 126 extending therethrough and channel 122 has a pair of centrally-flooding apertures 128 and 130 extending therethrough. As seen in FIG. 8, each of the flooding apertures 124 and 128 of the channels 120 is adjacent to the bottom 113 of the divider 110. The flooding apertures may be referred to as first apertures and the shuttle valve aperture 119 may be referred to as a second aperture.

Referring to FIG. 4, the divider 110 includes a plurality of sets 129, 132, 134 and 136 of radially spaced-apart sets of arcuate-shaped baffles 138, with each set being concentric about portion 131, 133, 135 and 137 of respective ones of the channels. The portions of the channels are spaced-apart from apertures 119, 121, 124, 126, 128 and 130. Portions 131 and 133 of channel 120 are positioned between apertures 119 and 124, and apertures 121 and 126, respectively. Portions 135 and 137 of channel 122 are positioned between apertures 119 and 128, and apertures 121 and 130, respectively. Portions 131 and 133 of channel 120 align with each other and portions 135 and 137 of channel 122 align with each other in this example. Portion 131 of channel 120 aligns with portion 135 of channel 122, and portion 133 of channel 120 aligns with portion 137 of channel 122 in this example.

The baffles 138 are ribs in this example. Each of the baffles extends upwards from the top 111 of the divider towards the top 42 of the system 40 seen in FIG. 3. Pairs of adjacent baffles form arcuate-shaped channels which are in fluid communication with its respective channel. This is shown by arcuate-shaped channels 140, 142, 144, 146, 148 and 150 of set 134 of baffles which are in fluid communication with channel 120. In this manner, the baffles function to promote selective dispersion of fluid from the channels to and along the bottom 117 of the upper chamber 108 of the assembly 80 in a rapid manner.

Figure 7:
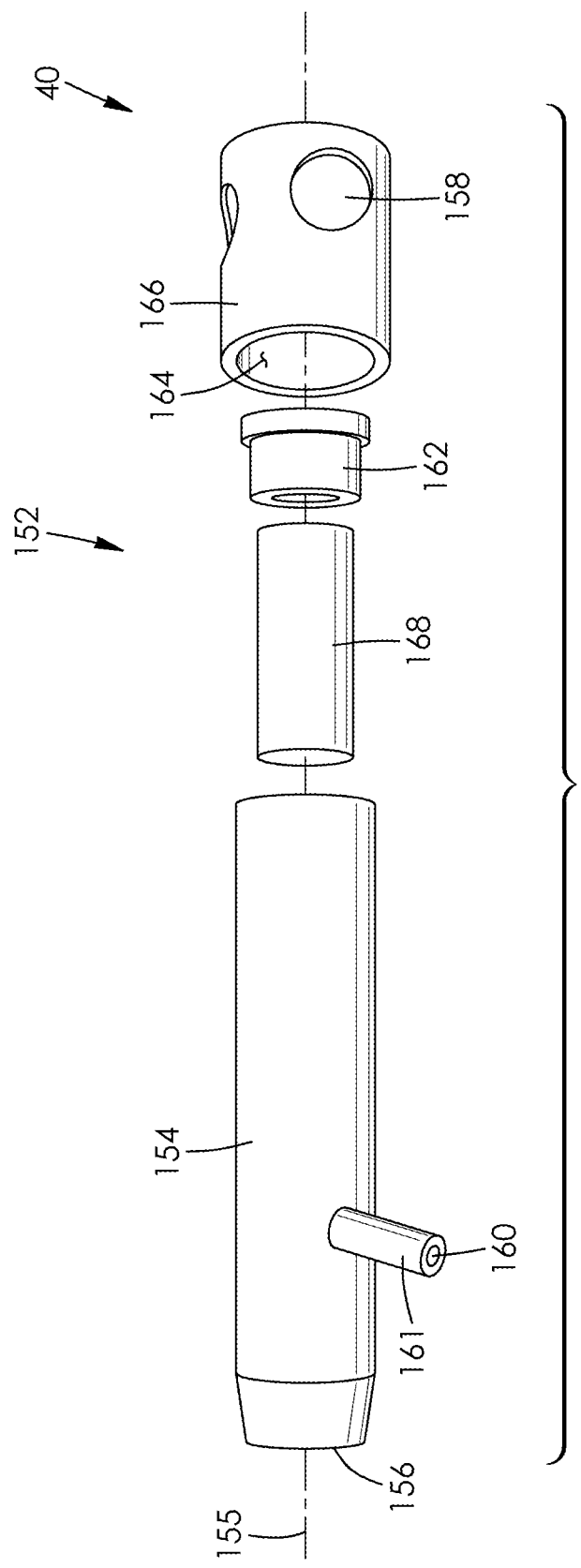
FIG. 7 is an exploded view of the shuttle valve of FIG. 1.

As seen in FIG. 7, the growth system 40 includes a release valve, in this example a shuttle valve 152. The shuttle valve includes an elongate valve chamber 154 having a longitudinal axis 155 and which is tubular and in the shape of a pipe in this example. The valve chamber has a lower opening 156, a plurality of circumferentially spaced-apart upper openings 158, and an intermediate side opening 160 between the lower and upper openings. The valve chamber is tubular and in the shape of a pipe in this example. As seen in FIG. 8, the shuttle valve 152 extends above shuttle valve aperture 119 in this example, with the lower opening 156 being in communication with the lower chamber 106. The lower portion 157 of the valve chamber 154 of the shuttle valve extends about aperture 119 in this example, though this is not strictly required. As seen in FIG. 7, the intermediate side opening 160 of the valve chamber 154 is positioned within the upper chamber 108 in this example, and extends through a pin 161 in this example. The upper openings 158 of the valve chamber are spaced-apart above the upper chamber of the container 82 in this example.

As seen in FIG. 7, the shuttle valve 152 includes an upper valve seat 162, which may be a pipe washer, for example. The upper valve seat is shaped to be received within the interior 164 of the upper portion 166 of the shuttle valve. The shuttle valve includes a valve element 168 moveable within the valve chamber 154 in parallel with the longitudinal axis 155 in this example. The valve element is cylindrical in shape in this example.

In operation and referring to FIG. 8, plant growth fluid 170 from the lower portion 66 of the manifold 58 passes into the lower chamber 106 of the container 82 via port 74, tube 109 and lower aperture 104 so as to at least partially fill the lower chamber with the plant growth fluid. The fluid may be referred to as nutrient solution and also passes through the flooding apertures 124 and 126 so as to partially fill the channels 120 of the divider 110.

The valve element 168 of the shuttle valve 152 functions to block lower opening 156 of the valve chamber 154 in a resting state and thus inhibits communication between the lower chamber 106 and upper chamber 108 thereby.

Referring to FIG. 9, turning on or actuating the air blower 54 selectively floods the upper chamber 108 with the fluid. The air blower blows air 56 through the manifold 58 and into the lower chamber 106. The air within the lower chamber rise upwards through the shuttle valve aperture 119 and lower opening 156 of the shuttle valve 152, causing the valve element 168 to rise upwards, and abut the upper valve seat 162. The valve element blocks the upper openings 158 of the shuttle valve in this flooding state. This inhibits fluid communication between lower chamber 106 and the upper openings 158 of the shuttle valve. Thus, upon turning on or actuating the air blower, the shuttle valve 152 moves to the flooding state shown in FIG. 9 in which communication between the lower chamber 106 and upper chamber 108 via the shuttle valve aperture 119 is promoted.

The actuation of the air blower 54 promotes movement of the fluid 170 from the lower chamber 106 through the flooding apertures 124 and 126 and into the upper chamber 108, as shown by arrow of numeral 172 in FIG. 9, in a rapid and time-efficient manner. The air blown into the lower chamber thus fluid therewithin therefrom to flash flood the upper chamber via the flooding aperture and channel 120. Pressurized air is used to rapidly displace the fluid from the lower chamber towards the upper chamber. Pressurized air blown into the lower chamber 106 thus causes nutrient solution therewithin adjacent the bottom 115 of the lower chamber to pass directly to the bottom 117 of the upper chamber 108 and towards the top 123 of the upper chamber. Referring to FIG. 4, the baffles 138 of the divider 110 thereafter function to promote selective dispersion of fluid from the channels 140, 142, 144, 146, 148 and 150 to the upper chamber 108 of the assembly 80.

The shuttle valve 152 releases air from the lower chamber 106 so that the nutrient solution rapidly fills and thereafter rapidly drains from the upper chamber 108, inhibiting oversaturation of the upper chamber thereby.

As seen in FIG. 9, overflow aperture 121 enables fluid from the upper chamber 108 to flow back to the lower chamber 107, as shown by arrow of numeral 174. In this manner, fluid 170 recirculates between the lower and upper chambers in this flooding state. Flooding fluid in the upper chamber may also cover aperture 119 in the flooding state, with air 56 coming into contact with said flooding fluid. FIG. 10 shows the system 40 in a more fully flooded state in which the upper chamber is more completely filled with fluid and in which the intermediate side opening 160 of the shuttle valve 152 is submerged below the waterline 176 of the fluid.

FIG. 11 shows the system 40 in a drain mode in which the air blower 54 is no longer operational. The cessation of forced air into the lower chamber 106, together with the weight of the fluid within the upper chamber 108, causes the fluid from the upper chamber to pass through the flooding apertures 124 and 126 and drain into the lower chamber 106. This is seen by arrow of numeral 177. This causes fluid levels within the lower chamber to rise, as seen by arrow of numeral 178.

Cessation of the forced air also causes the valve element 168 to lower towards its resting state, covering the lower opening 156. The dislodgement of the valve element downwards enables air to escape from the lower chamber, pass through the shuttle valve 152 and exit via the upper openings 158 of the shuttle valve, as seen by arrow of numeral 180. Removal of plug 71 from the outlet 70 of the manifold 58 enables the lower chamber 106 to be further drained as desired.

There is thus provided a method of growing plants. As seen in FIG. 8, the method includes providing container 82 with a lower chamber 106 or reservoir in a lower portion thereof, an upper chamber 108 or plant-growing chamber in an upper portion thereof, and one or more channels 120 which extend from adjacent the bottom 117 of the plant-growing chamber to adjacent the bottom 115 of the reservoir. Referring to FIG. 9, the method includes flash flooding the plant-growing chamber with nutrient solution from the reservoir by blowing pressurized air into the reservoir. The flash flooding step includes displacing the nutrient solution from the reservoir to the plant-growing chamber using an air blower that is motorized or electric powered.

The method including shaping the one or more channels 120 to extend horizontally between opposite ends 92 and 94 of the container 82. The method includes providing one or more flooding apertures 124 and 126 adjacent the bottom 113 of the one or more channels 120. The one or more flooding apertures are spaced-apart from opposite ends 92 and 94 of the container 82. Still referring to FIG. 9, the method includes providing one or more overflow apertures 119 and 121 in the plant-growing chamber in communication with the reservoir and which enable the nutrient solution passing therethrough to circulate back to the reservoir. The one or more overflow apertures are adjacent the top 111 of the one or more channels. The one or more overflow apertures 119 and 121 are adjacent one or more of ends 92 and 94 of the container 82.

Referring to FIG. 11 the method includes, after the flash-flooding step, rapidly draining the plant-growing chamber by ceasing to blow pressurized air into the reservoir, in this case by turning off operation of the air blower 54, and releasing residual pressurized air within the reservoir via a release valve or shuttle valve 152 in fluid communication with the top 125 of the reservoir.

Figure 12:
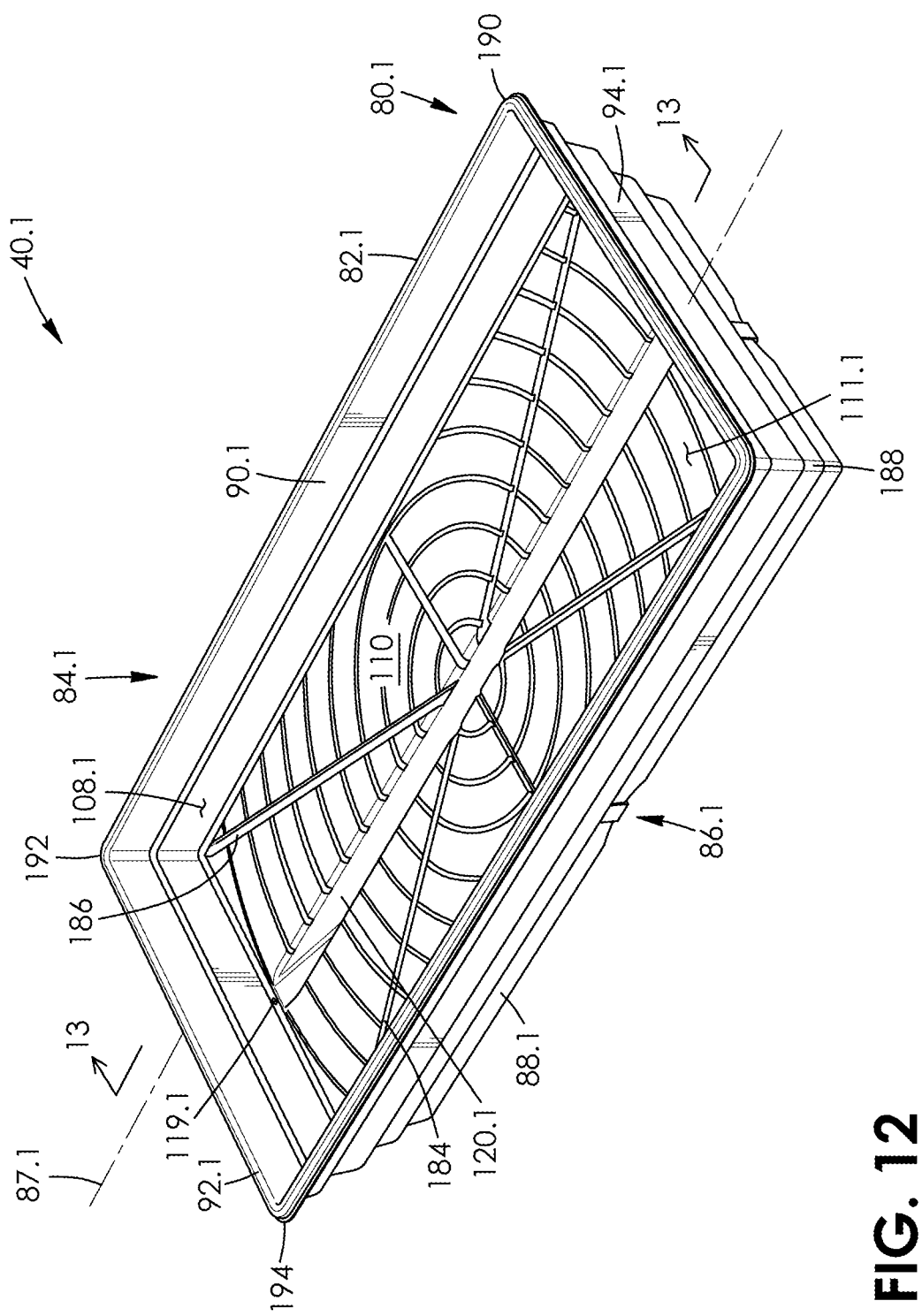
FIG. 12 is a top, side perspective view of a plant tray assembly for a hydroponic growth assembly according to a second aspect.
Figure 13:
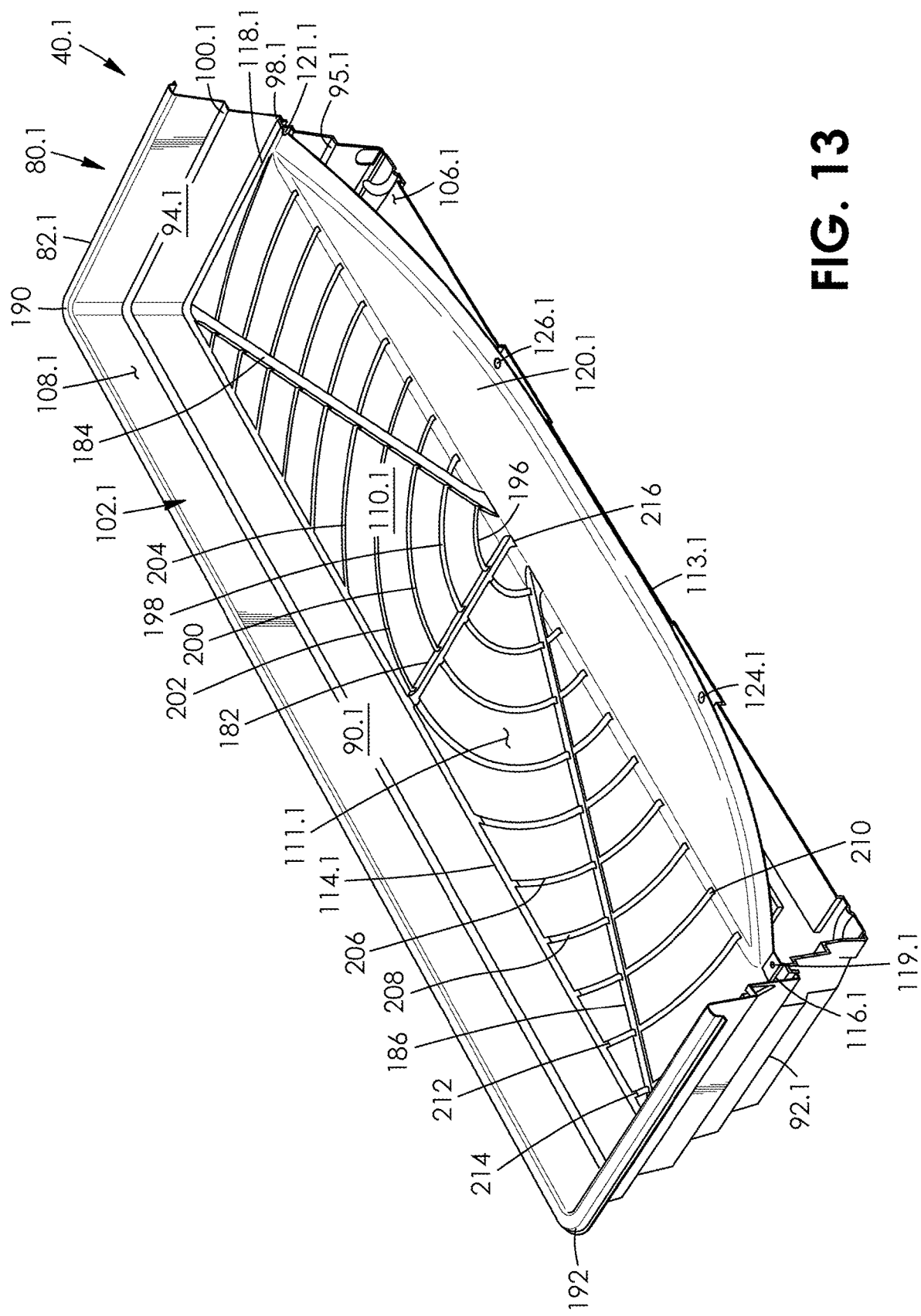
FIG. 13 is a longitudinal sectional perspective view of the plant tray assembly of FIG. 12 taken along lines 12-12 of FIG. 12.

FIGS. 12 to 13 show a hydroponic, plant tray assembly 80.1 for a hydroponic growth system 40.1 according to a second aspect. Like parts have like numbers and functions as the assembly and system shown in FIGS. 1 to 11 with the addition of decimal extension "0.1". Plant tray assembly 80.1 is substantially the same as the plant tray assembly 80 shown in FIGS. 1 to 11 with at least the following exceptions.

In this case, divider 110.1 has only a single longitudinally-extending channel 120.1 extending between ends 50.1 and 52.1 of the assembly in this example. The channel is centrally-positioned between the sides 88.1 and 90.1 of the container 82.1 in this example.

As seen in FIG. 12, the top 111.1 of the divider 110.1 includes a pair of laterally-extending grooves 182 and 183 positioned between the ends 92.1 and 94.1 of the container. The laterally-extending grooves are in fluid communication with and extend laterally outwards from channel 120.1. Laterally-extending groove 182 extends between side 90.1 of the container 82.1 and channel 120.1, and laterally-extending groove 183 extends between side 88.1 of the container and channel 120.1. The top of the divider further includes a pair of diagonally-extending grooves 184 and 186 which extend through the channel and which extend between opposite corners 188 and 192, and 190 and 194 of the container 82.1, respectively. The diagonally-extending grooves are in fluid communication with the channel 120.1.

The divider 110 has a plurality of radially spaced-apart sets of centrally-positioned arcuate-shaped recesses 196, 198, 200, 202, 204, 206, 208, 210, 212 and 214 with each set being concentric about a central region 216 of the channel 120.1.

Many advantages result from the structure of the hydroponic growing systems 40 and 40.1 and related methods as herein described. Air power is used in the systems as herein described to displace the nutrient solution in a lower reservoir or chamber 106. If solution stays in contact with the soil for too long, the soil may become over saturated and loose performance. The system as herein described uses air pressure from the air blower 54 to displace and return all of the solution in a timely manner. The shuttle valve 152 releases air from the reservoir or chamber 106 so that the solution can fill and drain very quickly to inhibit over saturation of the media.

The system as herein described is thus capable of flooding acres with thousands of gallons of nutrient all within a short window of time, such as 45 seconds, for example, and completely draining within a short period of time, such as another 45 seconds for example. This performance may result in superior growth in a rich soil grow medium 218 shown in dotted lines in FIG. 11. The system as herein described is thus not solely a hydroponic system but may be a fusion of both hydroponics and soil, with the benefits of both being obtained thereby. The system as herein described may thus comprise a flash feeding system which provides superior growth results.

It will be appreciated that many variations are possible within the scope of the invention described herein.

ADDITIONAL DESCRIPTION

Examples of hydroponic growing systems have been described. The following clauses are offered as further description.

(1) A hydroponic growth system comprising: a reservoir including a lower chamber, an upper chamber, and a divider therebetween, the divider having a first aperture and a second aperture; and an air blower which nutrient solution from the lower chamber to the upper chamber (2) The system of clause 1 wherein the valve includes a valve chamber having a lower opening in communication with the lower chamber, an intermediate opening in communication with the upper chamber and an upper opening, and wherein the valve includes a valve element moveable within the valve chamber, the valve element blocking said lower opening in the first state and blocking said upper opening in the second state.

(3) The system of clause 1, wherein the valve includes a valve chamber having a lower opening in communication with the lower chamber, an intermediate opening in communication with the upper chamber and an upper opening, and wherein the valve includes a valve element moveable within the valve chamber, whereby actuation of the air blower further causes air thereof to rise upwards through the lower opening of the valve and causes the valve element to rise upwards and block the upper opening of the valve.

(4) The system of clause 1 wherein the air blower is configured to emit air below the second aperture.

(5) The system of clause 1 wherein the air blower is configured to emit air adjacent to the second aperture.

(6) The system of clause 1 further including a manifold having a first inlet in fluid communication with the air blower, a port in fluid communication with the lower chamber of the reservoir, and an outlet to selectively drain fluid from the reservoir.

(7) The system of clause 6 wherein the outlet of the manifold is positioned level with or below the port of the manifold.

(8) The system of clause 1 wherein the system further includes a manifold having an upper portion to which the air blower operatively couples and having a lower portion in communication with the lower chamber of the reservoir, and wherein one of the reservoir and the manifold includes a hook-shaped member between the upper portion and the lower portion of the manifold and via which the manifold further couples to the reservoir.

(9) The system of clause 1 wherein the reservoir is a plant tray assembly.

(10) The system of clause 1 wherein the valve is a shuttle valve.

(11) The system of clause 1 wherein the reservoir has a bottom and a top, and wherein the first aperture of the divider is adjacent to the bottom of the reservoir and the second aperture of the divider is between the bottom and the top of the reservoir.

(12) The system of clause 1 wherein the divider has a top with which the second aperture thereof aligns and includes a longitudinally-extending channel which extends downwards from said top and through which the second aperture extends.

(13) The system of clause 1 wherein the divider includes at least one longitudinally-extending channel that is u-shaped in lateral cross-section and arcuate-shaped in longitudinal cross-section, with the first aperture extending through said channel.

(14) The system of clause 1 wherein the reservoir has a pair of spaced-apart ends and a pair of spaced-apart sides, wherein the divider has a planar top with which the second aperture thereof is aligned, the planar top extending between said sides and said ends of the reservoir, and wherein the divider includes a plurality of longitudinally-extending, evenly spaced-apart channels which extend between said ends of the reservoir, with the first aperture of the divider extending through a first one of said channels and a further aperture extending through a second one of said channels.

(15) The system of clause 1 whereby when the air blower is actuated, the reservoir is configured to cause flooding fluid in the upper chamber to cover the second aperture of the divider.

(16) The system of clause 15 whereby when the air blower is actuated, the air blower causes air to form which rise upwards and come into contract with said flooding fluid in the upper chamber covering the second aperture of the divider.

(17) The system of clause 1 wherein the first aperture is a lower aperture, wherein the divider has a third aperture which aligns with the second aperture, with the second aperture and the third aperture being upper apertures, and whereby, when the air blower is actuated, the reservoir is configured to cause flooding fluid in the tipper chamber to recirculate back to the lower chamber via said third aperture.

(18) The system of any one of clauses 1 to 17 wherein the air blower is motorized.

(19) The system of any one of clauses 1 to 17 wherein the air blower is electric powered.

(20) The system of any one of clauses 1 to 19 wherein pressurized air displaces the fluid from the lower chamber to the upper chamber.

(21) The system of any one of clauses 1 to 20 wherein the air blower is configured to selectively flash flood the upper chamber.

(22) The system of any one of clauses 1 to 21 wherein the air blower is configured to selectively rapidly flood and then drain the upper chamber.

(23) The system of any one of clauses 1 to 22 wherein the lower chamber and the upper chamber are adjacent to each other.

(24) A divider for a hydroponic tray assembly, the divider having a planar top and including at least one longitudinally-extending channel which couples to and extends downwards from said top, the channel being u-shaped in lateral cross-section and arcuate-shaped in longitudinal cross-section.

(25) A hydroponic tray assembly having a top and a bottom, and comprising a lower chamber extending upwards from said bottom of the assembly, an upper chamber extending downwards from said top of the assembly, and the divider of clause 24, the divider being positioned between the chambers, the divider having at least one lower aperture extending through said channel, the lower aperture being adjacent to the bottom of the assembly, and the assembly having an upper aperture aligned with the planar top of the divider.

(26) A hydroponic tray assembly comprising a lower chamber, an upper chamber, and a divider between the chambers, the divider having a first aperture, having a second aperture, and including at least one plurality of concentrically positioned and radially spaced-apart set of arcuate-shaped baffles.

(27) A hydroponic tray assembly comprising: a lower chamber; an upper chamber; and a divider between the lower chamber and the upper chamber, the divider having at least one aperture and including at least one concentrically positioned and radially spaced-apart set of arcuate-shaped, upwardly-extending baffles.

(28) The assembly of clause 1, wherein the divider has a planar top and wherein the baffles couple to and extend upwards from said planar top of the divider.

(29) The assembly of clause 1, wherein the divider has a planar top and includes at least one longitudinally-extending channel which couples to and extends downwards from the planar top thereof, and wherein the baffles are concentric about a portion of said at least one longitudinally-extending channel of the divider.

(30) The assembly of clause 29, wherein the portion of said at least one longitudinally-extending channel of the divider is spaced-apart from the at least one aperture of the divider.

(31) The assembly of clauses 29 or 30, wherein the divider has a first said aperture and a second said aperture, and wherein the portion of said at least one longitudinally-extending channel of the divider is between the first said aperture of the divider and the second said aperture of the divider.

(32) The assembly of clause 29, wherein the divider has a planar top and includes at least one longitudinally-extending channel which couples to and extends downwards from the planar top thereof, and wherein the baffles are concentric about a central region of said at least one longitudinally-extending channel of the divider.

(33) The assembly of clause 32, wherein the central region of said at least one longitudinally-extending channel is spaced-apart from the at least one aperture of the divider.

(34) The assembly of clauses 32 or 33, wherein the divider has a pair of spaced-apart sides and wherein the divider has at least one laterally-extending groove extending between said sides thereof

(35) The assembly of clause 34 wherein the at least one laterally-extending groove of the divider is in fluid communication with said at least one longitudinally-extending channel of the divider.

(36) The assembly of any of clauses 32 or 33 wherein the divider has a pair of laterally-extending grooves in fluid communication with and extending outwards from said at least one longitudinally-extending channel thereof

(37) The assembly of any of clauses 30 to 36, wherein the planar top of the divider has four spaced-apart corners, and wherein the divider includes a pair of diagonally-extending grooves which extend through said at least one longitudinally-extending channel of the divider and extend between opposite said corners of the planar top thereof.

(38) The assembly of clause 37 wherein the diagonally-extending grooves of the divider are in fluid communication with said at least one longitudinally-extending channel of the divider.

(39) The assembly of clause 27, wherein the divider has a planar top and includes a pair of spaced-apart, longitudinally-extending channels which couple to and extend downwards from the planar top thereof, wherein a first said set of baffles is concentric about a portion of a first said longitudinally-extending channel, and wherein a second said set of baffles is concentric about a portion of a second said longitudinally-extending channel.

(40) The assembly of clause 39, wherein the portion of the first said longitudinally-extending channel of the divider aligns with the portion of the second said longitudinally-extending channel of the divider.

(41) The assembly of clause 27, wherein the divider has a planar top and includes a pair of spaced-apart, longitudinally-extending channels which couple to and extend downwards from the planar top thereof, wherein a first said set of baffles is concentric about a first portion of a first said longitudinally-extending channel, wherein a second said set of baffles is concentric about a second portion of the first said longitudinally-extending channel, said second portion of the first said longitudinally-extending channel being spaced-apart from said first portion of the first said longitudinally-extending channel, wherein a third said set of baffles is concentric about a first portion of a second said longitudinally-extending channel, and wherein a fourth said set of baffles is concentric about a second portion of the second said longitudinally-extending channel, said second portion of the second said longitudinally-extending channel being spaced-apart from said first portion of the second said longitudinally-extending channel.

(42) The assembly of clause 41, wherein the first portion of the first said longitudinally-extending channel of the divider aligns with the first portion of the second said longitudinally-extending channel of the divider, and wherein the second portion of the first said longitudinally-extending channel of the divider aligns with the second portion of the second said longitudinally-extending channel of the divider.
(43) The assembly of any of clauses 39 to 42, wherein each said portion of the first said longitudinally-extending channel is spaced-apart from the at least one aperture of the divider, and wherein each said portion of the second said longitudinally-extending channel is spaced-apart from the at least one aperture of the divider.
(44) The assembly of any one of clauses 27 to 43 wherein each said baffle comprises a rib.
(45) The assembly of any one of clauses 27 to 44 wherein pairs of adjacent said baffles form arcuate-shaped channels.
(46) The assembly of any one of clause 30 to 39 wherein pairs of adjacent said baffles of each said set thereof form arcuate-shaped channels which are in fluid communication with said at least one longitudinally-extending channel.
(47) The assembly of any one of clauses 27 to 46 wherein the baffles function to promote selective dispersion of fluid within the upper chamber.
(48) The assembly of clause 46 wherein the baffles function to promote selective dispersion of fluid from the arcuate-shaped channels to the upper chamber.
(49) The assembly of any one of clauses 30 to 39, wherein the baffles function to promote selective dispersion of fluid from said at least one longitudinally-extending channel to the upper chamber.
(50) The assembly of any one of clauses 39 to 43, wherein the baffles function to promote selective dispersion of fluid from said longitudinally-extending channels to the upper chamber.
(51) A divider of any one of clauses 27 to 50.

It will also be understood by someone skilled in the art that many of the details provided above are by way of example only and are not intended to limit the scope of the invention which is to be determined with reference to at least the following claims.

What is claimed is:

1. A hydroponic growth system comprising:
a plant-growing chamber;
a reservoir coupled to and positioned below the plant-growing chamber, whereby air power-blown into the reservoir causes nutrient solution therewithin to flash flood the plant-growing chamber; and
a release valve between the plant growing chamber and the reservoir and which inhibits passage of fluid therethrough until said air is so power-blown, wherein the release valve includes a valve chamber, and wherein the valve chamber has one or more upper openings and an intermediate side opening between the lower and upper openings thereof.

2. A hydroponic growth system comprising:
a plant-growing chamber;
a reservoir coupled to and positioned below the plant-growing chamber, whereby air power-blown into the reservoir causes nutrient solution therewithin to flash flood the plant-growing chamber; and
a release valve between the plant growing chamber and the reservoir and which inhibits passage of fluid therethrough until said air is so power-blown, wherein the release valve has a side opening which is submerged in a flooded state of the plant growing chamber.

3. A hydroponic growth system comprising:
a plant-growing chamber;
a reservoir coupled to and positioned below the plant-growing chamber, whereby air power-blown into the reservoir causes nutrient solution therewithin to flash flood the plant-growing chamber; and
a release valve between the plant growing chamber and the reservoir and which inhibits passage of fluid therethrough until said air is so power-blown, wherein the release valve includes a valve chamber, the valve chamber having a lower opening and an upper valve seat spaced above the lower opening thereof, and wherein the release valve includes a valve element moveable within the valve chamber from said lower opening in a resting state thereof to said upper valve seat, with the valve element abutting the upper valve seat in a flooded state of the plant growing chamber.

4. The system as claimed in claim 3 further including a channel extending between the plant-growing chamber and the reservoir, the channel being shaped to promote distribution or draining of the nutrient solution across the span of the plant-growing chamber.

5. The system as claimed in claim 3, including at least one horizontally-extending elongate channel which extends from the plant-growing chamber towards the bottom of the reservoir, and at least one aperture extending through the at least one channel adjacent the bottom of the reservoir.

6. The system as claimed in claim 5, wherein the air blown into the reservoir causes the nutrient solution to flood the plant-growing chamber via the at least one aperture and the at least one channel.

7. The system as claimed in claim 3, wherein the release valve releases the air from the reservoir so that the nutrient solution selectively rapidly fills and thereafter rapidly drains from the plant-growing chamber, inhibiting over-saturation of the plant-growing chamber thereby.

8. The system as claimed in claim 3 wherein the release valve is a shuttle valve.

9. The hydroponic growth system according to claim 3, including a channel extending between the plant-growing chamber and the reservoir and extending from adjacent a first end of the chamber to adjacent a second end of the chamber, whereby the air power-blown into the reservoir causes nutrient solution therewithin to flash flood the plant-growing chamber via the channel.

10. The hydroponic growth system as claimed in claim 9, wherein the channel extends from adjacent the bottom of the plant-growing chamber to adjacent the bottom of the reservoir.

11. The hydroponic growth system as claimed in claim 9, wherein the plant-growing chamber has one or more overflow apertures in communication with the reservoir, with the one or more overflow apertures enabling the nutrient solution passing therethrough to circulate back to the reservoir.

12. The hydroponic growth system as claimed in claim 11, wherein the one or more overflow apertures are adjacent the top of the channel, and further comprising one or more flooding apertures adjacent the bottom of the channel via which the nutrient solution passes from the reservoir to the plant-growing chamber.

13. A hydroponic growth system comprising:
a plant-growing chamber;
a reservoir coupled to and positioned below the plant-growing chamber; and
a channel longitudinally-extending along the bottom of the plant-growing chamber between first and second ends of the plant-growing chamber, the channel being arcuate-shaped in longitudinal cross-section and upwardly concave, and the channel extending between the plant-growing chamber and the reservoir, and whereby air power-blown into the reservoir causes nutrient solution therewithin to flash flood the plant-growing chamber via the channel.

14. The system as claimed in claim 13 further including an air blower in fluid communication with the reservoir and via which the air is blown therein.

15. The system as claimed in claim 14 wherein the air blower is motorized.

16. The system as claimed in claim 14, wherein the air blower is electric powered.

17. The system as claimed in claim 13 wherein the air blown into the reservoir is used to rapidly displace the nutrient solution from the reservoir towards the plant-growing chamber.

18. The system as claimed in claim 13 wherein the nutrient solution passes from adjacent the bottom of the reservoir directly to the bottom of the plant-growing chamber and towards the top of the plant-growing chamber.

19. The hydroponic growth system as claimed in claim 13, wherein the channel is u-shaped in lateral section.

20. The system as in claim 13, including a release valve via which the plant-growing chamber and the reservoir are selectively in fluid communication.

* * * * *